US009503757B2

(12) United States Patent
Pahalawatta et al.

(10) Patent No.: US 9,503,757 B2
(45) Date of Patent: Nov. 22, 2016

(54) FILTERING FOR IMAGE AND VIDEO ENHANCEMENT USING ASYMMETRIC SAMPLES (75) Inventors: Peshala V. Pahalawatta, Glendale, CA (US); Alexandros Tourapis, Milpitas, CA (US); Athanasios Leontaris, Mountain View, CA (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 650 days.

(21) Appl. No.: 13/574,241

(22) PCT Filed: Jan. 7, 2011

(86) PCT No.: PCT/US2011/020461
§ 371 (c)(1),
(2), (4) Date: Jul. 19, 2012

(87) PCT Pub. No.: WO2011/094047
PCT Pub. Date: Aug. 4, 2011

(65) Prior Publication Data
US 2012/0293620 A1    Nov. 22, 2012

Related U.S. Application Data (60) Provisional application No. 61/300,115, filed on Feb. 1, 2010.

(51) Int. Cl.
*H04N 19/117*    (2014.01)
*H04N 19/85*    (2014.01)
(Continued)

(52) U.S. Cl.
CPC .............. *H04N 19/85* (2014.11); *H04N 19/31* (2014.11); *H04N 19/33* (2014.11); *H04N 19/48* (2014.11); *H04N 19/597* (2014.11); *H04N 19/80* (2014.11)

(58) Field of Classification Search
CPC .... H04N 19/597; H04N 19/48; H04N 19/85; H04N 19/33; H04N 19/31; H04N 19/80; H04N 13/0055; H04N 19/00769; H04N 13/0239; H04N 13/0059; H04N 13/0048
See application file for complete search history.

(56) References Cited

U.S. PATENT DOCUMENTS 5,732,156 A * 3/1998 Watanabe et al. ............ 382/239
5,742,343 A * 4/1998 Haskell et al. .......... 375/240.15
(Continued)

FOREIGN PATENT DOCUMENTS

EP    1455534    9/2004
JP    H07-162870    6/1995
(Continued)

OTHER PUBLICATIONS

J.R. Ohm, "Advances in Scalable Video Coding", Proc. of the IEEE, vol. 93, No. 1, Jan. 2005.
(Continued)

*Primary Examiner* — Mohammed Jebari
(74) *Attorney, Agent, or Firm* — Larry E. Henneman, Jr.; Henneman & Associates, PLC (57) ABSTRACT Filtering lower quality images or sequences of images with higher quality images or sequences of images. The filtering is utilized in a post-process, decoded, or encoded images including multiple sets of images that are filtered and/or combined. Different image features including, for example, quality, frequency characteristics, temporal resolution, spatial resolution, number of views, or bit-depth are present in the images. In one embodiment, the filtering comprises a multi-hypothesis filtering and the confidence value comprises a difference between the filtered sample and samples lying within a filter support. The post processes images are then stored or distributed.

57 Claims, 7 Drawing Sheets (51) Int. Cl.
*H04N 19/80* (2014.01)
*H04N 19/597* (2014.01)
*H04N 19/48* (2014.01)
*H04N 19/33* (2014.01)
*H04N 19/31* (2014.01)

(56) References Cited

U.S. PATENT DOCUMENTS

| | | | |
|---|---|---|---|
| 6,057,884 A * | 5/2000 | Chen et al. | 375/240.16 |
| 6,510,177 B1 * | 1/2003 | De Bonet et al. | 375/240.16 |
| 2004/0022318 A1 | 2/2004 | Garrido | |
| 2005/0062846 A1 * | 3/2005 | Choi et al. | 348/42 |
| 2005/0111543 A1 * | 5/2005 | Seo | 375/240.2 |
| 2007/0147492 A1 * | 6/2007 | Marquant et al. | 375/240.1 |
| 2008/0013623 A1 * | 1/2008 | Wang et al. | 375/240.1 |
| 2008/0232452 A1 * | 9/2008 | Sullivan et al. | 375/232 |
| 2008/0247462 A1 * | 10/2008 | Demos | 375/240.03 |
| 2009/0015662 A1 | 1/2009 | Kim | |
| 2010/0135393 A1 * | 6/2010 | Ying Gao et al. | 375/240.15 |
| 2011/0058610 A1 * | 3/2011 | Van Beek | H04N 19/198 375/240.16 |
| 2012/0026288 A1 | 2/2012 | Tourapis | |
| 2012/0092452 A1 | 4/2012 | Tourapis | |

FOREIGN PATENT DOCUMENTS

| | | |
|---|---|---|
| JP | 2007-081983 | 3/2007 |
| WO | 03/056843 | 7/2003 |
| WO | 2007047736 | 4/2007 |
| WO | 2010/075346 | 7/2010 |
| WO | 2010/123862 | 10/2010 |
| WO | 2011/005624 | 1/2011 |

OTHER PUBLICATIONS

Chan, T.F. et al., "Models for Local Nontexture Inpaintings" SIAM Journal of Applied Mathematics, vol. 62, No. 3, pp. 1019-1043, 2002.

Mallat S. et al., "A Review of Bandlet Methods for Geometrical Image Representation" Numerical Algorithms, vol. 44, No. 3, pp. 205-234, 2007.

Tourapis, A. et al., "Highly Efficient Predictive Zonal Algorithms for Fast Block-Matching Motion Estimation", IEEE Trans. on Circuits and Systems, vol. 12, No. 10, pp. 934-947, Oct. 2002.

Kimata H. et al., "Inter-view Prediction with Downsampled Reference Pictures" ITU Study Group 16—Video Coding Experts Group—ISO/IEC MPEG & ITU-T VCEG, Apr. 19, 2007.

Li, L. et al., "Wavelet Compression of Multiview Video with Disparity-Compensated Lifting" Signal Processing and Information Technology, 2007 IEEE International Symposium, Dec. 15, 2007, pp. 952-955.

Guleryuz, O.G. "Weighted Averaging for Denoising with Overcomplete Dictionaries" IEEE Trans. on Image Processing, vol. 16, No. 12, 2007, pp. 3020-3034.

Tourapis, H.Y.C. et al., "Fast Motion Estimation within the H.264 Codec" Proceedings of the International Conference on Multimedia and Expo, vol. 3, pp. 517-520, 2003.

\* cited by examiner

FILTERING FOR IMAGE AND VIDEO ENHANCEMENT USING ASYMMETRIC SAMPLES

CROSS-REFERENCE TO RELATED APPLICATIONS

This application claims priority to U.S. Patent Provisional Application No. 61/300,115, filed 1 Feb. 2010, hereby incorporated by reference in its entirety.

FIELD

The present disclosure relates to the field of image and video filtering. More in particular, it relates to filtering for image and video enhancement using asymmetric samples. Possible applications of the present disclosure include products developed for scalable and non scalable full resolution 3D stereoscopic video delivery. The teachings of the present disclosure can also be used in products that may include spatial or temporal scalability, including systems that encode interlace material.

DESCRIPTION OF EXAMPLE EMBODIMENTS

According to a first aspect, a method for processing samples of an image or sequence of images is provided, comprising: encoding a first set of samples with a first encoding process; encoding a second set of samples with a second encoding process; and combining encoded samples of the first set with information from the encoded samples of the second set to enhance the encoded samples of the first set.

According to a second aspect, a method for processing samples of an image or sequence of images is provided, comprising: encoding a first set of samples with a first encoding process; encoding a second set of samples with a second encoding process; decoding the encoded samples of the first set; decoding the encoded samples of the second set; and combining decoded samples of the first set with information from the decoded samples of the second set to enhance the decoded samples of the first set.

According to a third aspect, a method for post-processing an image or sequence of images after decoding is provided, comprising: providing a plurality of decoded images or sequences of images; and enhancing one or more of the decoded images or sequences of images using information from other decoded images or sequences of images of the plurality of decoded images or sequences of images.

According to a fourth aspect, a method for processing images is provided, comprising: encoding a first set of images; encoding a second set of images, wherein the first set and the second set are associated to an image feature, the image feature of the second set having values that are different from the values of the image feature of the first set; and filtering reconstructed images of the first set using reconstructed images from the second set.

According to a fifth aspect, a method to post-process decoded images is provided, comprising: providing a first set of decoded images having a first image feature; providing a second set of decoded images having a second image feature different from the first image feature; filtering the second set; and combining the filtered second set with the first set.

According to a sixth aspect, a method for processing images is provided, comprising: encoding a first set of images having a first image feature; encoding a second set of images of a second image feature better than the first image feature; frequency transforming the encoded first set of images and the encoded second set of images; normalizing one of the frequency transformed encoded set of images with information from the other frequency transformed encoded set of images; combining the normalized frequency transformed encoded one set of images with the frequency transformed encoded other set of images; and inverse transforming the combined sets of images.

According to a seventh aspect, a method for processing images in a temporal domain is provided, comprising: providing a first set of images of a first quality temporally interleaved with a second set of images of a second quality higher than the first quality; and enhancing the images of the first set by filtering the images of the first set with one or more of the images of the second set.

According to an eight aspect, a method for processing samples of an image or sequence of images is provided, comprising: processing a first set of samples with a first process; processing a second set of samples with a second process; encoding the processed samples; and combining the encoded samples of the first set with information from the encoded samples of the second set to enhance the encoded samples of the first set.

According to a ninth aspect, a method for processing samples of an image or sequence of images is provided, comprising: separating the samples into two or more regions; encoding the samples such that samples in different regions contain different features; and combining the encoded samples such that information from one or more regions is used to enhance the encoded samples of other regions.

Further embodiments of the present disclosure are provided in the specification, drawings and claims of the present application.

In image and video compression, a number of circumstances can lead to a state of asymmetric quality among different samples of a compressed content. Scalable video delivery, interlaced video coding, and 3D or multi-view video coding are some example applications that lead to processes in which some samples of the compressed image or sequence can be of significantly different quality than other samples of the same image or sequence.

Embodiments of the present disclosure are directed to methods for filtering among asymmetric quality samples of an image or sequence such that the lower quality samples are enhanced using information from other higher quality samples in the image or sequence through filtering or post-processing. In other words, the lower quality samples are improved through filtering with information from the higher quality samples. According to further embodiments of the present disclosure, methods of filtering are also disclosed where samples containing a certain amount of a desired or selected feature (e.g., frequency) are filtered with samples containing a different (usually higher) amount of such desired or selected feature.

Quality (or more generally information) can be measured, if needed. For example, a number of objective quality metrics exist, that can be used to measure image/video quality. Alternatively, such information could be signaled or provided through a combination of signaling and analysis. By way of example, a signal could provide information on what exactly the asymmetry is and how it could be measured, what are the regions to be enhanced and so on. For example, blockiness or some other artifacts could be measured given some rough definition of what the regions are, and then the difference or asymmetry between the samples and how such information is to be processed can be determined.

In scalable video delivery [see J. R. Ohm, "Advances in Scalable Video Coding," Proc. of the IEEE, vol. 93, no. 1, January 2005, incorporated herein by reference in its entirety], a base layer bitstream is typically encoded at a lower quality/resolution/number of views (in multi-view coding)/bit-depth etc. Then, one or more enhancement layer bitstreams are added that improve the overall quality of the video in terms of signal-noise ratio (SNR), resolution, number of views, or bit-depth depending on the type of scalability used. In some cases, the enhancement layer bitstreams may contain information for samples that were not contained in the base layer. For example, if the one or more enhancement layers are used for temporal resolution enhancement, each new enhancement layer may add one or more new pictures to the image sequence while also maintaining the existing base layer samples. Also, in general, each enhancement layer may contain information for samples such that when decoded, the decoded samples from each enhancement layer may be of significantly different quality (in terms of SNR, resolution, etc.) than that of the base and other layers of the encoded sequence.

According to an embodiment of the present disclosure, methods for filtering among samples of different layers in a scalable image/video codec are provided, where the layers encoded at lower quality are enhanced using the information from layers encoded at higher quality.

A further embodiment of the present disclosure is where filtering between asymmetric quality samples is adopted in interlaced video coding. In that case, the coded image sequence comprises alternating fields at twice the frame rate, where, for example, each field corresponds to either the odd or even lines of the original full resolution image at different time instances. The images are then "de-interlaced" at the playback or display device. It is possible that the video codec may choose to encode the odd/even fields using different encoding parameters, which lead to asymmetric quality between the fields. In that case, filtering methods such as those described in the present disclosure can be used to enhance either the lower quality fields, or the final de-interlaced images of the video. Therefore, processing and enhancement can occur either only on the lower quality samples or both on the lower quality and higher quality samples.

In addition to fields that correspond to odd/even lines of a 2D image, a similar concept as above can be applied to 3D or multiview video coding, where each field consists of information from one view at a given time instant. In a further embodiment, 3D or multiview images and video may be encoded as interleaved images using a frame compatible interleaving format. For example, checkerboard, line-by-line, side-by-side, over-under, are some of the techniques used to interleave two stereoscopic 3D views into one left/right interleaved image for the purpose of delivery. Again, in each of these cases, a similar state of asymmetric quality can arise among the views.

A further embodiment of the present disclosure is in the field of scalable delivery of 3D stereoscopic or multi-view video. In this case, the original full resolution images from each view may be subsampled, and then the subsampled views may be interleaved to form a "frame-compatible" base layer image for the purpose of transmission and display over existing video delivery pipelines [see U.S. provisional application No. 61/223,027 entitled "Encoding And Decoding Architectures For Format Compatible 3D Video Delivery", filed on Jul. 4 2009 and incorporated herein by reference in its entirety].

Figure 1:
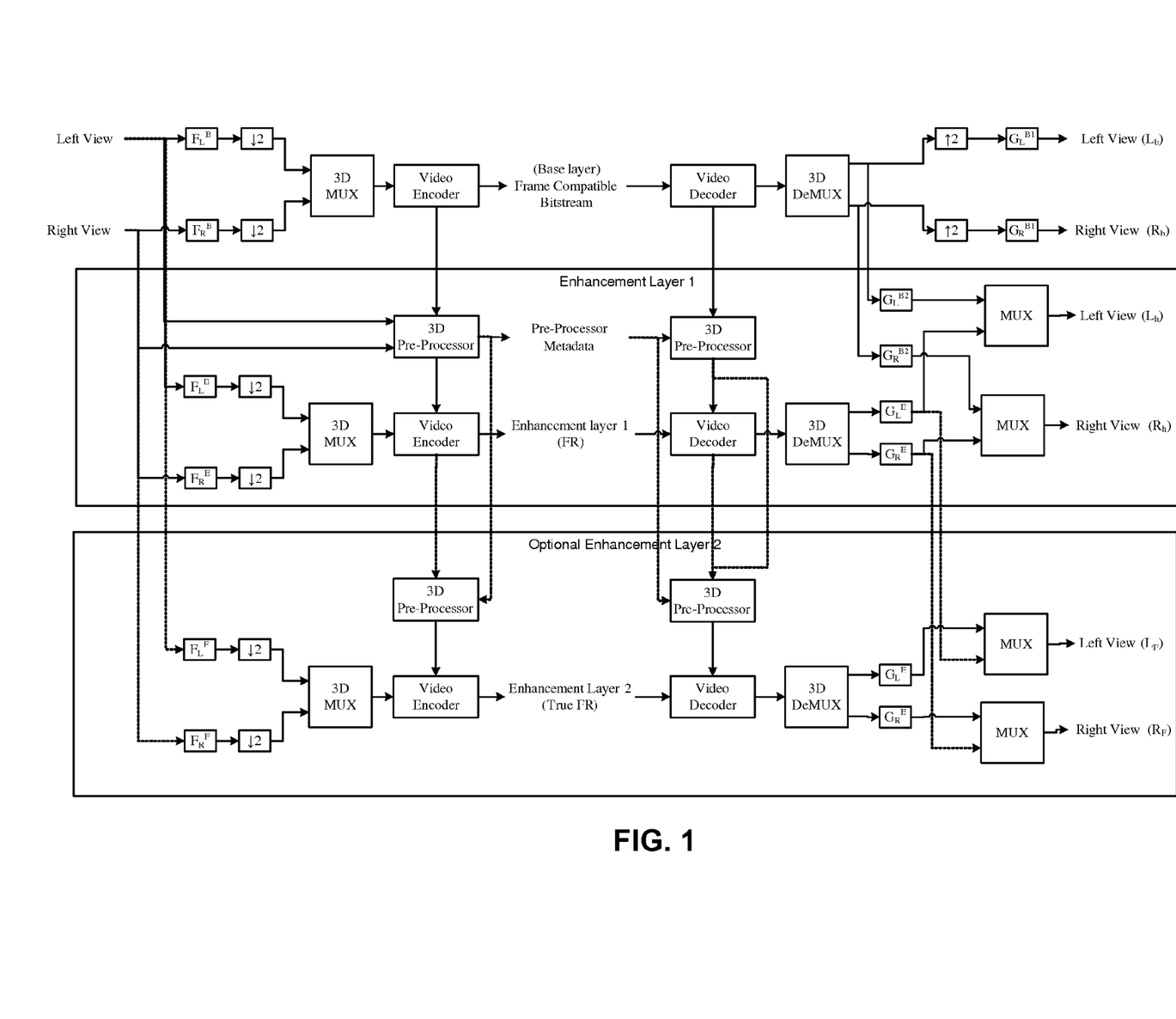
FIG. 1 shows a multi-layer 3D video coding system.

In that case, the delivery of full resolution video can be enabled by adding one or more enhancement layers that will provide information to help reconstruct the missing samples of the base layer (see FIG. 1). As shown in FIG. 1, the original full resolution images may need to be filtered prior to subsampling (see filters $F_L$, $F_R$ of FIG. 1) to create the lower resolution samples for each layer in order to reduce artifacts such as aliasing and to improve compression efficiency. The filters used at each stage, however, may be different. For example, more aggressive filtering may be needed for the base layer since the base layer samples will be interpolated to full resolution by a legacy display device. The video encoding parameters at each stage may also be different because the enhancement layers can take advantage of the already encoded base layer [See U.S. provisional application 61/170,995 entitled "Directed Interpolation And Data Post-Processing" filed on Apr. 20 2009 and incorporated herein by reference in its entirety]. Therefore, the samples of each layer may be asymmetric in terms of coding artifacts, frequency characteristics, and visual quality.

Figure 2:
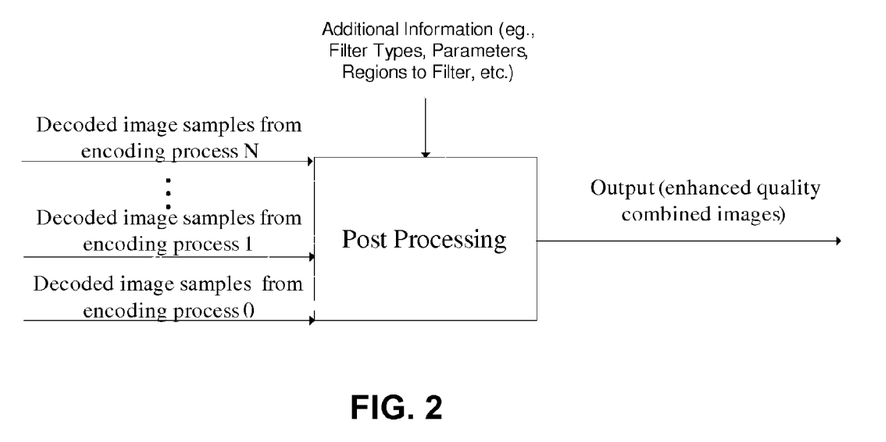
FIG. 2 shows inputs and outputs of a post-processing module.

According to an embodiment of the present disclosure, the image quality enhancement can occur as a post-processing applied to the decoded images of the video decoder. FIG. 2 illustrates the basic inputs and outputs of an exemplary post-processing module in accordance with the embodiment. The input image samples coming from processes 0, 1, . . . , N can be, by way of example and not of limitation, decoded images from different layers in a scalable bitstream, different fields in an interlaced bitstream or different views in a multi-view coded bitstream. In one embodiment, the post-processing module can also take as input additional information such as the filter types and filter parameters to use for post-processing. The parameters and filters may be specified at a sequence or image level, a region level, such as a block of pixels, a slice of an image, etc, or in the extreme case at a pixel level. This additional information can be either process specific and come from a particular process 0, 1, ..., N or be process a specific. The additional information can be generated at the encoder and transmitted along with the encoded bitstream.

Figure 3:
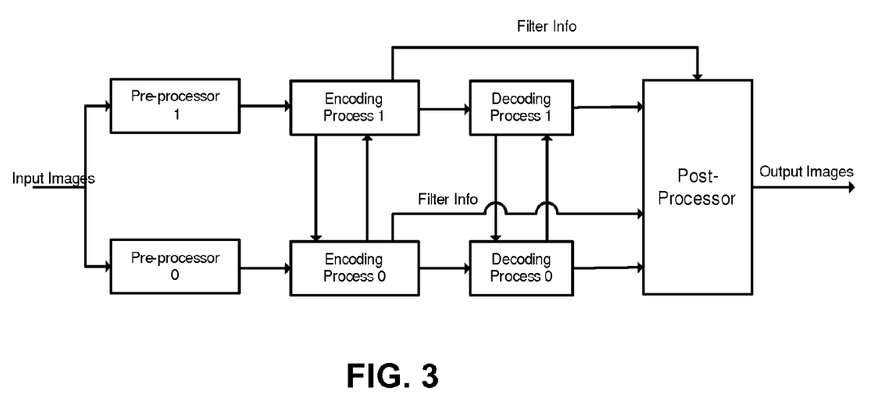
FIG. 3 shows an embodiment of post-processing in an asymmetric quality video encoding system with optional filter information passed by the encoder.

FIG. 3 illustrates a further embodiment of the disclosure in which the image sequence undergoes multiple different pre-processing and encoding stages before being post-processed. Each stage may apply to a different spatial or temporal region of the sequence. Depending on the type of encoding that is performed, however, the spatial and temporal regions at each stage may also overlap. As shown in FIG. 3, additional information may be generated at each encoding stage, which can aid the post-processor in determining the type of filtering to be applied in order to enhance the final quality of the decoded video. The additional information can be detailed information about the types of filters and filter parameters to use, the regions to be filtered, etc., which will help reduce the complexity of the post-processing module. In another embodiment, the additional information can be information about the encoding parameters used at each stage of encoding such as for example, the quantization step-sizes used, the accuracy of the motion estimation (eg. half-pel, quarter-pel), whether in-loop filtering such as deblocking is used or not, etc. The post-processor can then use the additional information to determine the type and amount of filtering that needs to be performed on the decoded images. More generally, samples that contain a certain kind of information are combined with samples that contain a different kind of information. Prior to combination, filtering of the first set, second set or both sets of samples can occur.

For example, in the case of scalable 3D video coding as illustrated in FIG. 1, the post processor can receive as input the decoded images from the subsampled base and enhancement layers, and output full resolution images after filtering over the samples from each layer. In this case, the base layer is left/right interleaved, and a first enhancement layer can be used to reconstruct the pixels that had been dropped in order to create the base layer. For example, in the line-by-line interleaved case, the even numbered rows of the left view and the odd numbered rows of the right view may be encoded in the base layer, while the odd numbered rows of the left view and the even numbered rows of the right view will be encoded in the first enhancement layer. In the checkerboard interleaved case, the same will be applied to pixels whose rows and columns sum to even (left view) vs. odd (right view) parity. In the side-by-side case, the base layer may contain the even numbered columns of the left view and odd numbered columns of the right view, and the enhancement layer will contain the odd numbered column of the left view and even numbered columns of the right view, and in the over/under case, the same may be applied on the rows of the image. Note that the above described sample positions are exemplary schemes and other sampling methods may also be employed with each of the above interleaving cases. In a different embodiment, the original samples may be filtered such that the base layer contains the low frequency information from the original data, and the enhancement layer contains the high frequency information. In some other embodiments, the pre-processing stages may filter samples across multiple views at each layer. In all of these cases, the enhancement layer encoder can use information from the base layer in order to improve the compression efficiency of the enhancement layer bitstream. Additional data may also be generated at the base and enhancement layer encoders that will supply additional information to the post-processing module. For example, the information about the regions might include encoding parameters used to encode the regions, what is the difference between them, how to best post-process, the regularity of motion, and so on. Such information may also include post-processing metadata such as information about the regions, what is the difference between them, how best to post-process and so on. A similar process can also be considered in scalable 2D applications as well.

Figure 4:
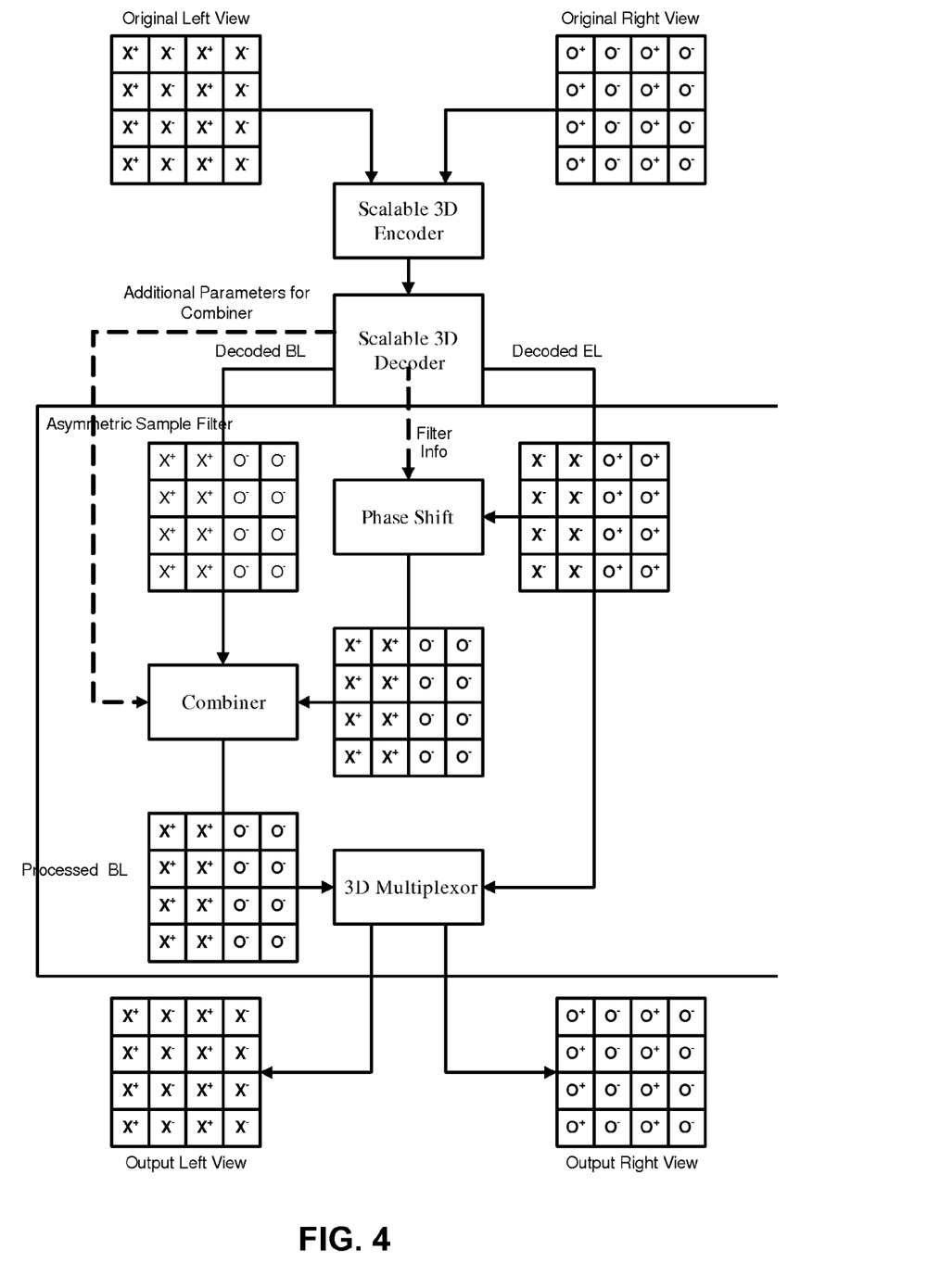
FIG. 4 shows an embodiment of post-processing for interleaved images when the enhancement layer contains samples having different quality from that of the base layer or when the base layer and/or the base layer by themselves have samples of different quality.

As shown in FIG. 4 for a specific embodiment of a side-by-side formatted stereo pair with one enhancement layer, the asymmetric quality sample filter used as a post-processing module takes as input the $L^+/R^-$ interleaved decoded base layer, and the $L^-/R^+$ interleaved decoded enhancement layer. The post-processing module of FIG. 4 comprises a phase shifter that uses the decoded enhancement layer samples to generate a set of processed values that are co-located with the base layer samples. Then, the base and processed enhancement layer samples are combined to form a newly enhanced base layer. In particular, the parameters sent to the combiner can be used to determine the confidence placed in each set of samples, which in turn can be used to determine the weights/coefficients for combining the base and processed enhancement layer samples. The combination can depend on the relationship between the enhancement and base layers. If side-by-side 3D is applied, for example, combination occurs by interleaving the samples horizontally. If line-interleaved or over-under 3D is applied, the samples are interleaved vertically. The processed base layer and the decoded enhancement layer are then multiplexed to generate full resolution left and right view outputs where the samples corresponding to the base layer positions have been further processed by using the neighboring enhancement layer samples as a guide. The person skilled in the art will understand that the same concepts can be applied to a case when processed base layer samples are used to further improve the quality of the enhancement layer. Also, the concepts can be applied to non-stereoscopic spatially scalable applications where the base layer contains an image or sequence sampled at a lower resolution, and the enhancement layer contains samples that help bring the images to full resolution. The same concepts may also be used in the case that more than one enhancement layer is available, as well as in the case when interlaced coding instead of scalable coding is used. While the embodiment of FIG. 4 makes specific reference to phase shifting, the person skilled in the art will understand that other types of filtering can be used, such as smoothing, sharpening, phase shifting, frequency domain filtering, and so on.

Figure 5:
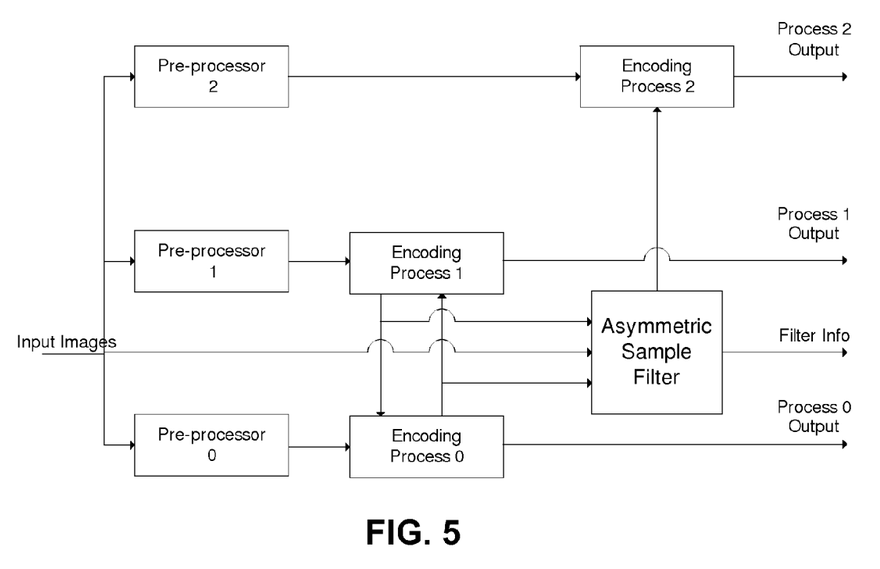
FIG. 5 shows an example of an in-loop asymmetric sample filter.

In another embodiment of the present disclosure, the filtering between asymmetric samples can be performed as part of the encoding loop (see FIG. 5). In this case, one set of samples may be encoded at a low quality (see encoding process 0), and another set of samples may be encoded at a higher quality (see encoding process 1). Then, the reconstructed samples of each set may be combined using an asymmetric quality filter. The output of the asymmetric quality filter can then be encoded as another encoding process (for example, the residual between the reconstructed samples from the asymmetric quality filter and the original samples may be encoded, see encoding process 2) and transmitted to the decoder. If desired, information that is additional to the encoded images, such as filter parameters, region information, and so on, can be transmitted to the decoder. Such information may be transmitted in the form of an external signal, embedded in the bitstream as part of the elementary stream (e.g., as a Supplemental Enhancement Information message), embedded in the transport stream, or may even be hidden in the bitstream in the form of a image/video watermark. This scheme can, for example, be used in the optional second enhancement layer depicted in FIG. 1. In that case, the output of the first enhancement layer, and the base layer can be filtered using an asymmetric quality filter based on the encoding parameters used for each layer, and the characteristics of the reconstructed images. Then, the residual between the filtered output from the asymmetric quality filter and the original image samples can be encoded as the optional second enhancement layer.

Figure 6:
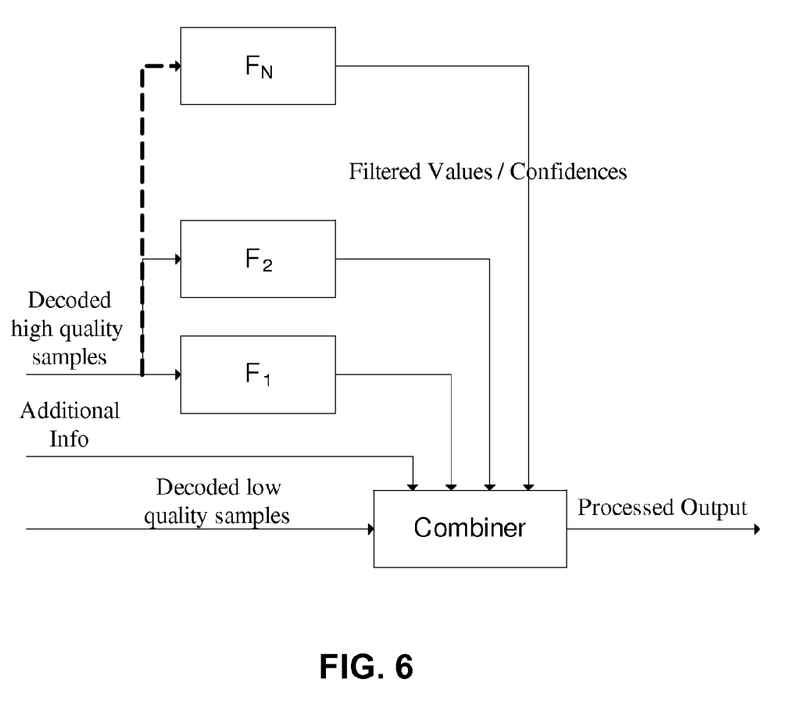
FIG. 6 shows an example of a multi-hypothesis filter and combiner for processing asymmetric quality samples.

FIG. 6 shows a further embodiment where a multi-hypothesis filter and combiner are used in order to enhance the quality of a set of samples using information from a set of higher quality samples. A multi-hypothesis filter is a filter that may generate N different alternative filter outputs or hypotheses, from which one or more of them can be later selected. The filters $F_1, \ldots, F_N$ can be of varying types, and can include horizontal, vertical, or diagonal filters, non-separable filters that use neighborhood samples, bilateral filters, etc. Overcomplete methods that perform filtering in the transform domain may also be used in this context. See, for example, O. G. Guleryuz, "Weighted Averaging for Denoising with Overcomplete Dictionaries," *IEEE Trans. on Image Processing*, vol. 16, no. 12, 2007, pp. 3020-3034, incorporated herein by reference in its entirety. Overcomplete methods perform the transform of different overlapping regions and then examine the frequency information of all transformed regions, find relationships and perform filtering across all regions, given content characteristics and overlapping relationships. The filters are used to generate separate sets of filtered samples using information contained in the higher quality samples.

According to some embodiments, the filtered samples can be generated to be co-located with the lower quality samples. In such cases, information from high quality samples can be used to obtain an estimate of the sample located at each position that is currently occupied by a sample encoded using a low quality encoding process. Then, the estimate and the existing low quality sample can be combined to form the output. According to other embodiments, the samples containing one kind of information are not co-located (e.g., at a slightly different phase) with the samples containing the other kind of information. For example, in the case of a system such as illustrated in FIG. 4, the filters may be interpolation filters that attempt to reconstruct the missing samples in the high quality layer using the available samples in that layer. In one embodiment, the set of filters to be used in the multi-hypothesis filter, or the filter parameters, can be signaled as additional data to the asymmetric quality sample filter.

Also, samples generated from other interpolation schemes, such as the methods described in US Provisional Application No. 61/140,886 entitled "Content Adaptive Sampling Rate Conversion For Interleaving And Deinterleaving Of Images" filed on Dec. 25 2008 and incorporated herein by reference in its entirety, inpainting [see T. F. Chan and J. Shen, "Mathematical models for local nontexture inpaintings," SIAM Journal of Applied Mathematics, vol. 62, no. 3, pp. 1019-1043, 2002, incorporated herein by reference in its entirety], wavelet, contourlet, and bandlet upsampling techniques [see S. Mallat and G. Peyre, "A review of bandlet methods for geometrical image representation," Numerical Algorithms, vol. 44, no. 3, pp. 205-234, incorporated herein by reference in its entirety] may be used as hypotheses in the multi-hypothesis filter.

Also, in one embodiment, one set of filters may be provided for filtering luma samples and another set for filtering chroma samples. In a related scheme, the chroma filter parameters, though different, may be inferred from the parameters of the luma filter. For example, when the chroma is sampled at a lower resolution than the luma, filters with similar characteristics but different support may be used for the luma vs chroma components.

In addition to the filtered sample value, each filter in the multi-hypothesis design shown in FIG. 6 can also determine a confidence value for the filtered sample. For example, the confidence can be measured as a difference measure between the filtered sample and the samples that lie within the filter support, such as filter length or taps. In an embodiment, the difference measure can be a mean squared difference, or in another embodiment the mean absolute difference can be used to reduce computational complexity. The difference measurement may be calculated in the original colorspace of the source content, or be based on a different colorspace, such as the colorspace of the display, or a combination of both. In an embodiment, all of the samples that lie within the support can be used to measure the confidence, or in another embodiment, the support region can be subsampled and the difference can be calculated using the subsampled values.

Also, in another embodiment, the distance metric can be weighted differently for different samples. For example, samples that lie further away from the filtered sample can be weighted lower than samples that lie in the immediate neighborhood. In another embodiment, the confidences, calculated as described above, after applying the filter on multiple chroma and luma components of the image, can be combined to form a combined confidence value for the filter. In another embodiment, the set of filters or the filter parameters used, for a particular luma or chroma component of the image can be predicted based on the filters that were found to be of high confidence in a previously filtered luma or chroma component. For example, a more complex edge adaptive filter can be used to generate the hypotheses for the first component of an image. Then, based on the edge direction found to be of highest confidence (for example for the direction such that the sum difference measure between the filtered value and filter support is minimum) in the first component, less complex directional filters that interpolate along directions that lie within a given maximum angle of the edge found in the first component can be used as the multi-hypothesis filter set for the other components.

The combiner of FIG. 6 uses the filtered values and the confidence in each filtered value, along with the low quality decoded sample value to determine the output value for the sample position. In an embodiment, the combination can be a weighted combination of the decoded low quality sample value and all filtered values with confidence above a threshold $T_1$, where the low quality sample can be weighted based on the encoding quality of the low quality samples relative to the high quality samples. The quality difference between the low quality samples and the high quality samples can be determined based on encoding parameters, such as the quantization step sizes used to generate the samples, the amount of pre-processing performed on the input to the encoder, the amount of post-processing such as deblocking performed on each set of samples, the pixel accuracy of the motion vectors, etc. The regularity of the motion information as well as the motion vector lengths may also be used as a measure of the temporal quality of the samples.

Also, a sharpness analysis, or a more complex objective quality measurement of each set of samples (low and high quality) can help determine the relative visual quality of each set of samples, and thereby the weighting provided for each set. In another embodiment, a weighted average between the low quality sample and the filtered value with the maximum confidence can be used. In another embodiment, only the filtered values that lie within a range of ±d from the low quality sample value can be used.

Filtering between asymmetric quality samples may also be performed in a transform domain. This is especially useful in applications where different encoding processes undergo different pre-processing stages that result in asymmetric distortion in the frequency domain. For example, the base layer samples of a scalable system may be filtered more aggressively than the enhancement layer samples. This may occur in order to improve the compression efficiency of the base layer, or to improve the visual quality of the base layer when viewed from a lower resolution display. Also quantization matrices may be used that bias in favor of specific frequencies, and in turn in favor of one layer over another.

Figure 7:
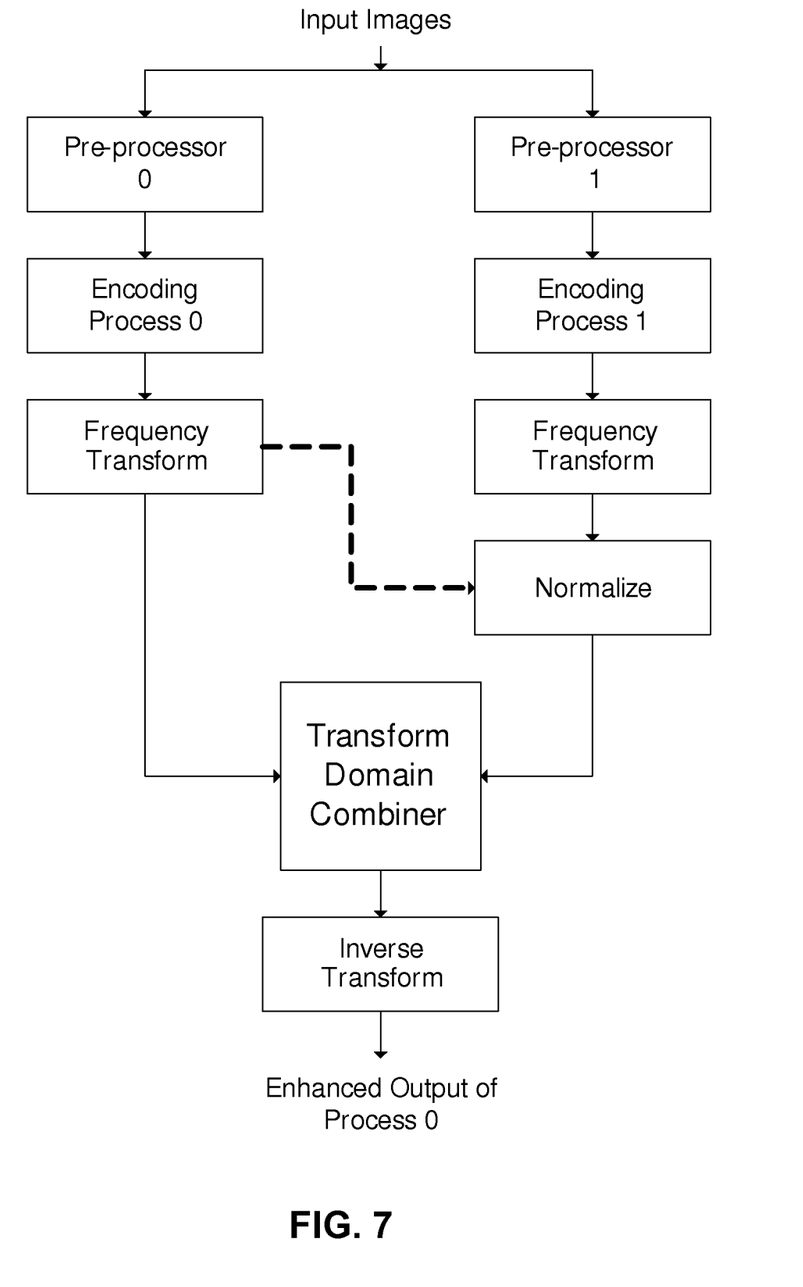
FIG. 7 shows a frequency domain method for filtering asymmetric quality samples.

FIG. 7 illustrates a frequency domain filtering scheme that can be used to improve the performance of the lower quality encoding process. In this case, the reconstructed image output after each encoding process is transformed into frequency domain, using any one of DCT, FFT, wavelet transforms, etc. Then, the transform coefficients of the higher quality encoding process may be normalized to better match the corresponding coefficients in the lower quality encoding process. For example, this may involve energy normalization, or a phase shift in the case of a Fourier transform or wavelet transform. Then the normalized coefficients from the samples previously encoded at a higher quality are combined with the transform coefficients of samples previously encoded at a lower quality. This may involve a weighted combination of matching coefficients, or a scaling of a subset of coefficients of the lower quality encoding process to match the energy of the corresponding coefficients from the higher quality encoding process. Subsequently, an inverse transform retrieves the enhanced output of the lower quality encoding process. It should be noted that such a frequency domain technique may also be used as part of a multi-hypothesis method as discussed in the previous paragraph. In that case, overlapped transforms may also be used in order to generate multiple frequency domain hypotheses for the filtered samples and then a linear, or non-linear combination of the multiple frequency and spatial domain hypotheses may be used to generate the post-processed samples.

The embodiment of FIG. 7 describes normalization of the high quality samples. More generally, two different sets having different information can be processed and one set can be enhanced by combining such set with information from the other set, possibly through additional filtering of one set, the other set or both. Moreover, the two different sets can be obtained through an initial determination of overlap and differences, so that images (or regions) containing a first kind of information are grouped separately from images (or regions) containing a second kind of information.

Filtering between asymmetric quality samples may also be performed in the temporal domain. In this case, motion adaptive approaches and motion compensated temporal filtering can be used to filter across asymmetric quality samples in temporally neighboring regions. Such approaches can also be extended to temporally scalable video coding systems.

Figure 8:
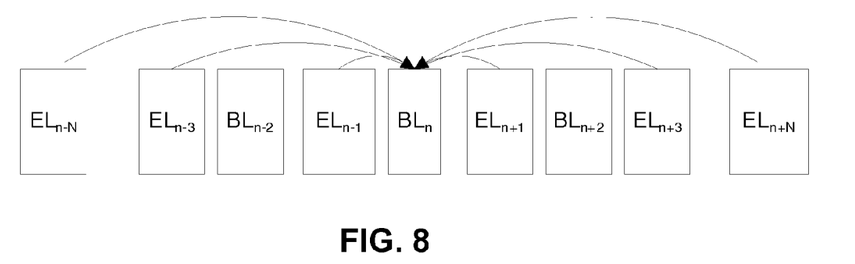
FIG. 8 shows post-processing for temporal scalability applications.
Figure 9:
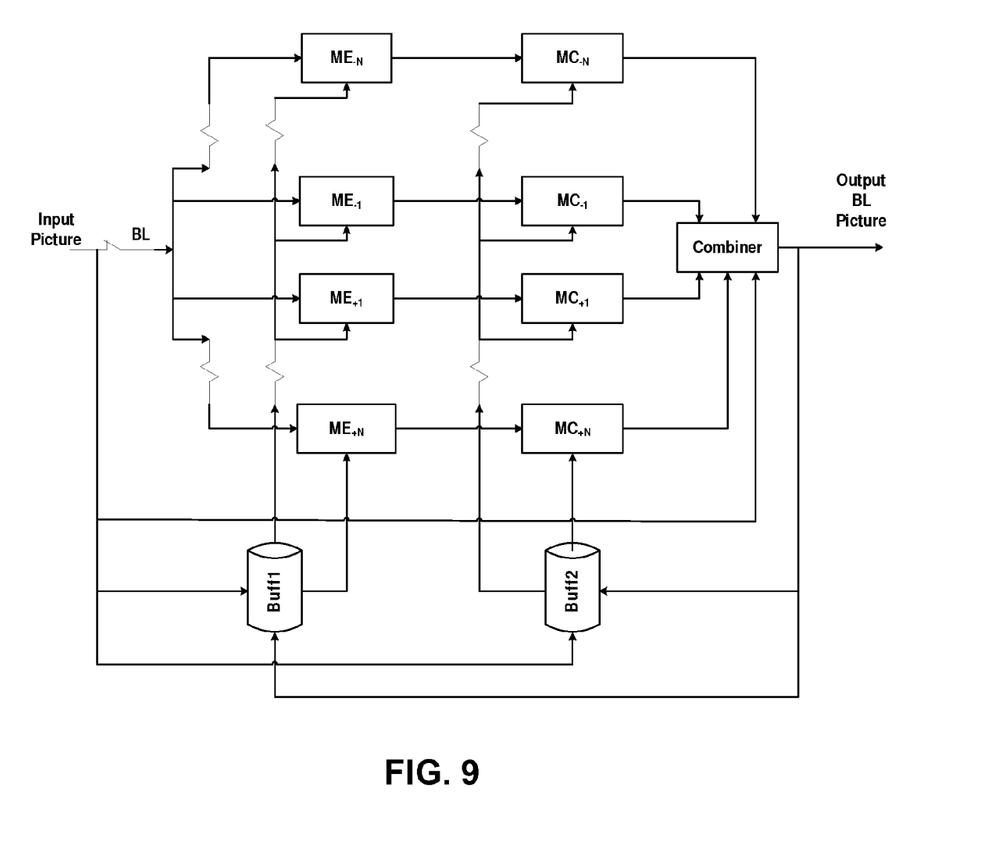
FIG. 9 shows MCTF based post-processing for temporal scalability applications.

FIG. 8 illustrates the application of the asymmetric sample quality enhancement concept to temporally scalable video. For clarity, consider the case when the original sequence is halved in temporal resolution, and the base layer comprises pictures with indices 0, 2, . . . , n−2, n, n+2, . . . , etc. Note that the same techniques can be applied to other levels of temporal scalability as well as interlaced coding. The enhancement layer comprises the remaining pictures with indices 1, 3, . . . , n−1, n+1, . . . , etc. Then, the base layer picture at time index, n, can be enhanced by filtering with information from the enhancement layer pictures at n−N, . . . , n−1, n+1, . . . , n+N. Motion estimation methods, such as the Enhanced Predictive Zonal Search (EPZS), see H.-Y. C. Tourapis and A. M. Tourapis, "Fast motion estimation within the H.264 codec," Proceedings of the International Conference on Multimedia and Expo, vol. 3, pp. 517-520, 2003, incorporated herein by reference in its entirety], can be used to track the movement of pixel regions within the sequence, and enable the filtering to be a motion compensated filtering process (FIG. 9). In the temporal filtering case, in addition to the enhancement layer pictures, previously filtered base layer pictures (kept in Buff1, and Buff2) can also be used for the filtering of the current base layer picture.

In another embodiment, the teachings of the present disclosure may also be applied in the case that the same encoding process is used but the inputs to the encoding process are from asymmetric quality sources or differently pre-processed sources. For example, in the 3D stereoscopic case, the input may be a side-by-side formatted stereo pair where one view is more aggressively filtered prior to down-sampling than the other. In that case, information from the less aggressively filtered view may be used to enhance the quality of the more aggressively filtered view as part of a post-processing scheme.

Figure 10:
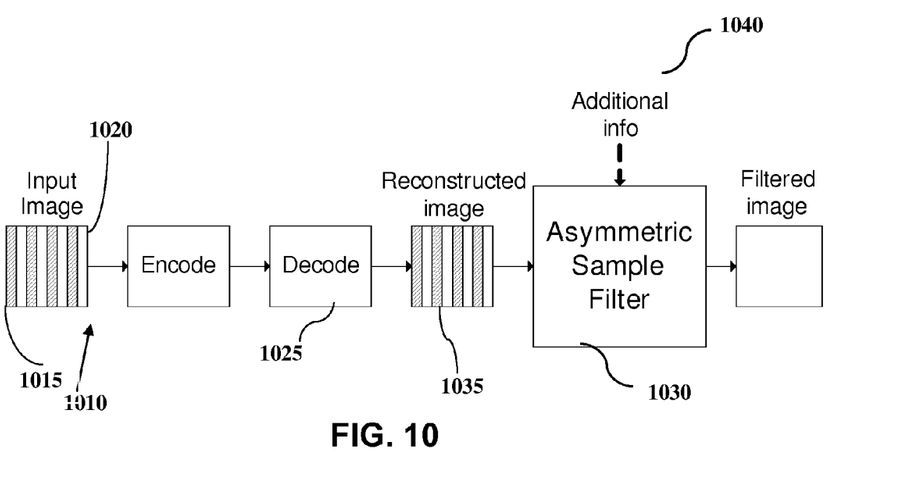
FIGS. 10 and 11 show examples of a single encoding process applied to two or more different sets of samples.

FIG. 10 illustrates an example embodiment in which the input to the encoder (1005) comprises column interleaved images (1010) where the shaded columns (1015) contain samples with different information than the unshaded columns (1020). After encoding (1005) and reconstruction (1025) of the samples, an asymmetric filtering (1030) is performed on the reconstructed images (1035) in order to combine the information from the differently processed input samples. As shown in the figure, the asymmetric sample filter may use a priori information (1040) based on knowledge of the pre-processing applied on the input samples to the encoder in order to determine the filtering method, and the filter parameters. Also, note that although the example in the illustration relates to spatially asymmetric input samples, the same can also be applied for temporally asymmetric samples, as well as content where one set of input samples contains different frequency characteristics than another set of input samples. Also note that the asymmetric filtering may also be applied within the encoder as part of an in-loop filter.

In another embodiment, the same encoding process may be used for all samples but one set of samples may be treated differently than another during the encoding process. For example, the quantization of transform coefficients may be such that some coefficients remain at higher precision than others. Also, distortion estimation for macroblock mode decisions, and motion parameter estimation decisions may be performed in a manner that biases one set of samples over another. For example, a weighted PSNR metric may be used that weights one set of samples higher than another. Such operations will also cause asymmetric quality between samples of the decoded images. The teachings of this disclosure may be used in such embodiments to enhance the quality of samples that are degraded due to such an asymmetric encoding process.

Figure 11:
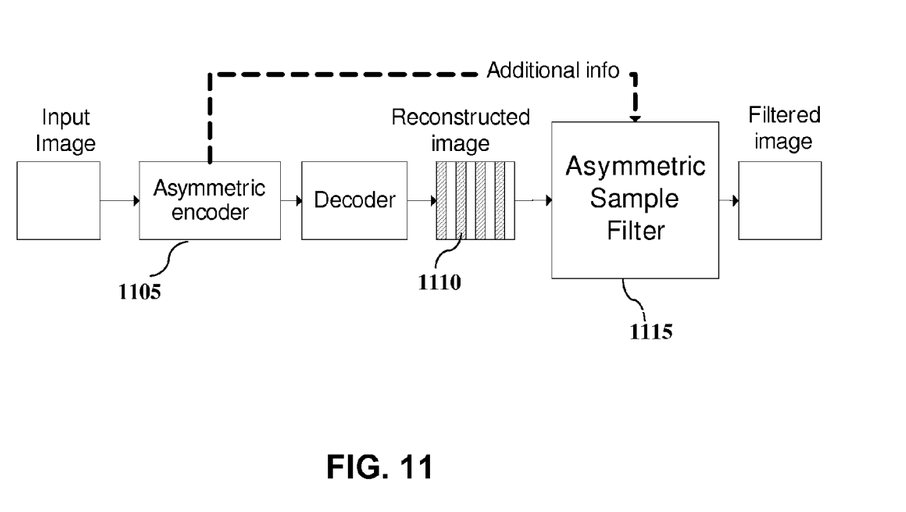

FIG. 11 illustrates such a process, where samples in odd columns are treated differently from samples in the even columns during an "asymmetric" encoding process (1105). Then, the reconstructed images (1110) may contain asymmetric quality samples that, given information about the encoding process, can be filtered (1115) to obtain a better quality reconstructed image. Again, as before, the same will apply for temporal and frequency domain differences among regions of samples, and the process can also be applied within the encoder as part of an in-loop filter.

In conclusion, the teachings of the present disclosure can be used to enhance the quality of images and video, when some regions, or components, of the image or video are known to be of better overall quality than others.

The methods and systems described in the present disclosure may be implemented in hardware, software, firmware or combination thereof. Features described as blocks, modules or components may be implemented together (e.g., in a logic device such as an integrated logic device) or separately (e.g., as separate connected logic devices). The software portion of the methods of the present disclosure may comprise a computer-readable medium which comprises instructions that, when executed, perform, at least in part, the described methods. The computer-readable medium may comprise, for example, a random access memory (RAM) and/or a read-only memory (ROM). The instructions may be executed by a processor (e.g., a digital signal processor (DSP), an application specific integrated circuit (ASIC), or a field programmable logic array (FPGA)).

All patents and publications mentioned in the specification may be indicative of the levels of skill of those skilled in the art to which the disclosure pertains. All references cited in this disclosure are incorporated by reference to the same extent as if each reference had been incorporated by reference in its entirety individually.

It is to be understood that the disclosure is not limited to particular methods or systems, which can, of course, vary. It is also to be understood that the terminology used herein is for the purpose of describing particular embodiments only, and is not intended to be limiting. As used in this specification and the appended claims, the singular forms "a," "an," and "the" include plural referents unless the content clearly dictates otherwise. The term "plurality" includes two or more referents unless the content clearly dictates otherwise. Unless defined otherwise, all technical and scientific terms used herein have the same meaning as commonly understood by one of ordinary skill in the art to which the disclosure pertains.

The examples set forth above are provided to give those of ordinary skill in the art a complete disclosure and description of how to make and use the embodiments of the speedup techniques for rate distortion optimized quantization of the disclosure, and are not intended to limit the scope of what the inventors regard as their disclosure. Modifications of the above-described modes for carrying out the disclosure may be used by persons of skill in the video art, and are intended to be within the scope of the following claims.

A number of embodiments of the disclosure have been described. Nevertheless, it will be understood that various modifications may be made without departing from the spirit and scope of the present disclosure. Accordingly, other embodiments are within the scope of the following claims.

The invention claimed is:

1. A method for processing samples of an image or sequence of images, the method comprising:
encoding a first set of samples with a first encoding process;
encoding a second set of samples with a second encoding process;
filtering reconstructed samples of the first set based on information associated with at least one of the first encoding process and the second encoding process; and
combining the filtered reconstructed samples of the first set with reconstructed samples of the second set to obtain a new representation of the reconstructed samples of the second set; and
wherein the filtering comprises a multi-hypothesis filtering and a confidence value comprising a difference between each filtered reconstructed sample of the first set and samples lying within a filter support;
wherein the multi-hypothesis filtering comprises generating, for each reconstructed sample of the first set, a plurality of different filter outputs; and
the combining includes selecting one of the different filter outputs as the filtered reconstructed samples of the first set;
wherein the selecting includes selecting one of the different filter outputs as the filtered reconstructed samples of the first set based on the confidence value in relation to a threshold.

2. The method as recited in claim 1, wherein the first set of samples and the second set of samples are taken from different layers of a scalable video delivery application.

3. The method as recited in claim 2, wherein one of the first set of samples and the second set of samples is taken from a base layer bitstream and the other of the first set of samples and the second set of samples is taken from an enhancement layer.

4. The method as recited in claim 1, wherein the first set of samples and the second set of samples are taken from different fields of an interlaced image sequence or different views of an interleaved 3D or multiview image sequence.

5. The method as recited in claim 4, wherein the samples of the first set correspond to even fields of the interlaced or interleaved image sequence and the samples of the second set correspond to odd fields of the interlaced or interleaved image sequence or vice versa.

6. The method as recited in claim 4, wherein the interlaced or interleaved image sequence comprises a 3D image sequence, the samples of the first set correspond to left stereoscopic views of the interlaced or interleaved image sequence and the samples of the second set correspond to right stereoscopic views of the interlaced or interleaved image sequence or vice versa.

7. The method as recited in claim 4, wherein the interlaced or interleaved image sequence comprises a multi-view image sequence, the samples of the first set correspond to images pertaining to a first view of the interlaced or interleaved image sequence and the samples of the second set correspond to images pertaining to a second view of the interlaced or interleaved image sequence.

8. The method as recited in claim 1, wherein the encoded samples of the first set have one or more different features from the encoded samples of the second set, and wherein a feature among the different features comprises any one of quality, frequency characteristics, temporal resolution, spatial resolution, number of views, or bit-depth.

9. The method as recited in claim 8, wherein the encoded samples of the first set have different quality of the encoded samples of the second set.

10. The method as recited in claim 9, wherein the encoded samples of the first set have higher quality than the encoded samples of the second set.

11. A method for processing samples of an image or a sequence of images, the method comprising:

encoding a first set of samples with a first encoding process;

encoding a second set of samples with a second encoding process;

decoding the encoded samples of the first set;

decoding the encoded samples of the second set;

filtering decoded samples of the first set based on information associated with at least one of the first encoding process and the second encoding process; and combining the filtered decoded samples of the first set with the decoded samples of the second set to obtain a new representation of the decoded samples of the second set; and wherein the filtering comprises a multi-hypothesis filtering and a confidence value comprising a difference between each filtered decoded sample of the first set and samples lying within a filter support;

wherein the multi-hypothesis filtering comprises generating, for each reconstructed sample of the first set, a plurality of different filter outputs; and the combining includes selecting one of the different filter outputs as the filtered reconstructed samples of the first set;

wherein the selecting includes selecting one of the different filter outputs as the filtered reconstructed samples of the first set based on the confidence value in relation to a threshold.

12. The method as recited in claim 11, wherein the decoded samples of the first set have one or more different features from the decoded samples of the second set, and wherein a feature among the different features comprises any one of quality, frequency characteristics, temporal resolution, spatial resolution, number of views, or bit-depth.

13. The method as recited in claim 12, wherein the decoded samples of the first set are of different quality than the decoded samples of the second set.

14. The method as recited in claim 13, wherein the decoded samples of the first set are of higher quality than the decoded samples of the second set.

15. A method for post-processing an image or sequence of images after decoding, the method comprising:

providing a plurality of decoded images or sequences of images; and filtering one or more of the decoded images or sequences of images based on information associated with other decoded images or sequences of images of the plurality of decoded images or sequences of images;

combining one or more of the filtered decoded images or sequences of images with other decoded images or sequences of images of the plurality of decoded images or sequences of images, thus obtaining a new representation of the other decoded images or sequences of images of the plurality of decoded images or sequences of images; and wherein the filtering comprises a multi-hypothesis filtering and a confidence value based on a difference between each filtered decoded image or sequence of images and samples lying within a filter support;

wherein the multi-hypothesis filtering comprises generating, for each reconstructed sample of the first set, a plurality of different filter outputs; and the combining includes selecting one of the different filter outputs as the filtered reconstructed samples of the first set;

wherein the selecting includes selecting one of the different filter outputs as the filtered reconstructed samples of the first set based on the confidence value in relation to a threshold.

16. The method as recited in claim 15, wherein the filtering further uses additional information distinct from the other decoded images or sequences of images.

17. The method as recited in claim 16, wherein the additional information is selected from filtering type information, parameter information, region level or filter information.

18. The method as recited in claim 16, wherein the additional information comprises filter information from previous encoding or decoding processes on the decoded images or sequences of images.

19. The method as recited in claim 15, wherein the plurality of decoded images or sequences of images comprise decoded base layer images and decoded enhancement layer images, and wherein the filtering comprises filtering the decoded enhancement layer images and combining the decoded base layer images with corresponding filtered decoded enhancement layer images to obtain a new representation of the decoded base layer images.

20. The method as recited in claim 19, wherein filtering is selected from smoothing, sharpening, phase shifting, and frequency domain filtering.

21. The method as recited in claim 15, wherein the enhancement comprises a quality enhancement.

22. The method as recited in claim 15 wherein the images or sequences of images comprise part of an application selected from a 2D application, a 3D application or a multi-view application.

23. A method for processing images, the method comprising:

encoding a first set of images;

encoding a second set of images; and filtering reconstructed images of the first set based on reconstructed images from the second set;

combining the filtered reconstructed images of the first set with the reconstructed images from the second set, thus obtaining a new representation of the reconstructed images of the second set; and wherein the first set and the second set are associated to an image feature, the image feature of the second set having values that differ from the values of the image feature of the first set;

the image feature comprises one or more of quality, frequency characteristics, temporal resolution, spatial resolution, number of views, or bit-depth; and the filtering is performed using a multi-hypothesis filtering with a confidence value comprised of a difference between each filtered reconstructed image of the first set and samples lying within a filter support;

wherein the multi-hypothesis filtering comprises generating, for each reconstructed sample of the first set, a plurality of different filter outputs; and the combining includes selecting one of the different filter outputs as the filtered reconstructed samples of the first set;

wherein the selecting includes selecting one of the different filter outputs as the filtered reconstructed samples of the first set based on the confidence value in relation to a threshold.

24. The method as recited in claim 23, further comprising:

further encoding the new representation of the reconstructed images of the second set; and transmitting to a decoder the further encoded new representation of the reconstructed images of the second set.

25. The method as recited in claim 24, wherein the new representation of the reconstructed images of the second set are further encoded as part of a residual image containing a difference between original images of the second set and the new representation of the reconstructed images of the second set.

26. The method as recited in claim 24, further comprising transmitting to the decoder information additional to the further encoded new representation of the reconstructed images of the second set.

27. The method as recited in claim 23, wherein the second set of images comprises a part of a base layer of a scalable video application and the first set of images comprises a part of an enhancement layer of the scalable video application.

28. The method as recited in claim 24, wherein:
the second set of images comprises a part of a base layer of a scalable video application;
the first set of images comprises a part of a first enhancement layer of the scalable video application, and
the further encoded new representation of the reconstructed images of the second set comprises part of a second enhancement layer of the scalable video application.

29. The method as recited in claim 23, wherein the image feature comprises an image quality.

30. A method to post-process decoded images, the method comprising:
providing a first set of decoded images having a first image feature;
providing a second set of decoded images having a second image feature different from the first image feature;
filtering the second set; and
combining the filtered second set with the first set; and wherein
the image feature comprises one or more of quality, frequency characteristics, temporal resolution, spatial resolution, number of views, or bit-depth; and
the second set filtering comprises a multi-hypothesis filtering using a confidence value based on a difference between each filtered sample of the filtered second set and samples lying within a filter support;
wherein the multi-hypothesis filtering comprises generating, for each reconstructed sample of the first set, a plurality of different filter outputs; and
the combining includes selecting one of the different filter outputs as the filtered reconstructed samples of the first set;
wherein the selecting includes selecting one of the different filter outputs as the filtered reconstructed samples of the first set based on the confidence value in relation to a threshold.

31. The method as recited in claim 30, wherein the second set filtering comprises dividing the second set into subsets and filtering each of the subsets with a separate filter.

32. The method as recited in claim 31, wherein the second set filtering comprises providing a confidence value for each of the filtered subsets.

33. A method to post-process decoded images, the method comprising:
providing a first set of decoded images having a first image feature;
providing a second set of decoded images having a second image feature different from the first image feature;
filtering the second set; and
combining the filtered second set with the first set; and wherein
the image feature comprises one or more of quality, frequency characteristics, temporal resolution, spatial resolution, number of views, or bit-depth;
filtering the second set comprises a multi-hypothesis filtering and providing a confidence value for each filtered second set or subset of the filtered second set; and the confidence value comprises a difference between the filtered second set or the subset of the filtered second set and samples lying within a filter support;
wherein the multi-hypothesis filtering comprises generating, for each reconstructed sample of the first set, a plurality of different filter outputs; and
the combining includes selecting one of the different filter outputs as the filtered reconstructed samples of the first set;
wherein the selecting includes selecting one of the different filter outputs as the filtered reconstructed samples of the first set based on the confidence value in relation to a threshold.

34. The method as recited in claim 33, wherein the difference comprises a weighted difference.

35. The method as recited in claim 33, wherein the first set is weighted before being combined with the filtered second set.

36. The method as recited in claim 35, wherein the weighting is based on an encoding quality of the second set of images relative to an encoding quality of the first set of images.

37. The method as recited in claim 33, wherein the first image feature and the second image feature comprise an image quality.

38. A method for processing images, the method comprising:
encoding a first set of images having a first image feature;
encoding a second set of images of a second image feature;
frequency transforming the encoded first set of images and the encoded second set of images;
normalizing one of the frequency transformed encoded set of images with information from the other frequency transformed encoded set of images;
combining the normalized frequency transformed encoded one set of images with the frequency transformed encoded other set of images;
inverse transforming the combined sets of images; and wherein
the image feature comprises one or more of quality, frequency characteristics, temporal resolution, spatial resolution, number of views, or bit-depth; and
the method further comprises filtering at least one of the encoded first set of images and the encoded second set of images with a multi-hypothesis filtering and generating a confidence value comprising a difference between each filtered encoded first set of images or each filtered encoded second set of images and samples lying within a filter support;
wherein the multi-hypothesis filtering comprises generating, for each reconstructed sample of the first set, a plurality of different filter outputs; and
the combining includes selecting one of the different filter outputs as the filtered reconstructed samples of the first set;

wherein the selecting includes selecting one of the different filter outputs as the filtered reconstructed samples of the first set based on the confidence value in relation to a threshold.

39. A method for processing images in a temporal domain, the method comprising:
providing a first set of images of a first quality temporally interleaved with a second set of images of a second quality higher than the first quality; and
filtering the images of the second set based on one or more of the images of the first set;
combining one or more of the images of the first set with the filtered images of the second set, thus obtaining a new representation of the images of the first set; and
wherein the filtering comprises a multi-hypothesis filtering using a confidence value based on a difference between each filtered image of the second set and samples lying within a filter support;
wherein the multi-hypothesis filtering comprises generating, for each reconstructed sample of the first set, a plurality of different filter outputs; and
the combining includes selecting one of the different filter outputs as the filtered reconstructed samples of the first set;
wherein the selecting includes selecting one of the different filter outputs as the filtered reconstructed samples of the first set based on the confidence value in relation to a threshold.

40. The method as recited in claim 39, wherein the filtering comprises a motion compensated filtering.

41. A method for processing samples of an image or sequence of images, comprising:
filtering a first set of samples with a first filtering process;
filtering a second set of samples with a second filtering process;
encoding at least one of the filtered first set of samples and filtered second set of samples; and
filtering reconstructed samples of the first set with information from reconstructed samples of the second set;
combining the filtered reconstructed samples of the first set with the reconstructed samples of the second set, thus obtaining a new representation of the reconstructed samples of the second set; and
wherein the filtering reconstructed samples of the first set comprises a multi-hypothesis filtering utilizing a confidence value comprising a difference between each filtered reconstructed sample of the first set and samples lying within a filter support;
wherein the multi-hypothesis filtering comprises generating, for each reconstructed sample of the first set, a plurality of different filter outputs; and
the combining includes selecting one of the different filter outputs as the filtered reconstructed samples of the first set;
wherein the selecting includes selecting one of the different filter outputs as the filtered reconstructed samples of the first set based on the confidence value in relation to a threshold.

42. The method as recited in claim 41, wherein the filtering reconstructed samples depends on information based on knowledge of the first and second filtering processes.

43. The method as recited in claim 41, wherein the first set of samples is spatially asymmetric with respect to the second set of samples.

44. The method as recited in claim 41, wherein the first set of samples is temporally asymmetric with respect to the second set of samples.

45. The method as recited in claim 41, wherein one or more frequency characteristics of the first set of samples differ from one or more frequency characteristics of the second set of samples.

46. The method as recited in claim 41, wherein the reconstructed samples filtering step comprises a part of the encoding step.

47. A method for processing samples of an image or a sequence of images, the method comprising:
separating the samples into at least a first region and a second region, wherein each region comprises any one of a temporal region or spatial region;
encoding the samples of the first region with a first encoding process and the samples of the second region with a second encoding process, wherein samples in different regions contain one or more different image features as a result of encoding the samples of the first region and the samples of the second region using different encoding processes; and
filtering reconstructed samples of the first region based on information from reconstructed samples of the second region; and
combining the filtered reconstructed samples of the first region with reconstructed samples of the second region to obtain a new representation of the reconstructed samples of the second region; and wherein
the image feature comprises one or more of quality, frequency characteristics, temporal resolution, spatial resolution, number of views, or bit-depth; and
the filtering comprises a multi-hypothesis filtering using a confidence value comprised of a difference between each filtered reconstructed sample of the first region and samples lying within a filter support;
wherein the multi-hypothesis filtering comprises generating, for each reconstructed sample of the first set, a plurality of different filter outputs; and
the combining includes selecting one of the different filter outputs as the filtered reconstructed samples of the first set;
wherein the selecting includes selecting one of the different filter outputs as the filtered reconstructed samples of the first set based on the confidence value in relation to a threshold.

48. The method as recited in claim 47, wherein samples of one region are spatially asymmetric with respect to samples of another region.

49. The method as recited in claim 47, wherein samples of one region are temporally asymmetric with respect to samples of another region.

50. The method as recited in claim 47, wherein samples of one region have different frequency characteristics from samples of another region.

51. The method as recited in claim 47, wherein the filtered reconstructed samples combining step comprises a part of the encoding step.

52. An apparatus for processing a video signal, the apparatus comprising:
a processor; and
a non-transitory computer-readable storage media that comprises a set of instructions stored therewith which, when executed by the processor, causes, controls or programs the processor to perform a method for processing samples of an image or sequence of images, the method comprising the steps of:

encoding a first set of samples with a first encoding process;

encoding a second set of samples with a second encoding process;

filtering reconstructed samples of the first set based on information associated with at least one of the first encoding process and the second encoding process; and combining the filtered reconstructed samples of the first set with reconstructed samples of the second set to obtain a new representation of the reconstructed samples of the second set; and wherein the filtering comprises a multi-hypothesis filtering and a confidence value comprising a difference between each filtered reconstructed sample of the first set and samples lying within a filter support;

wherein the multi-hypothesis filtering comprises generating, for each reconstructed sample of the first set, a plurality of different filter outputs; and the combining includes selecting one of the different filter outputs as the filtered reconstructed samples of the first set;

wherein the selecting includes selecting one of the different filter outputs as the filtered reconstructed samples of the first set based on the confidence value in relation to a threshold.

53. A computer, which is programmed or configured for processing a video signal, the computer comprising:

a processor; and a non-transitory computer-readable storage media that comprises a set of instructions stored therewith which, when executed by the processor, causes, controls or programs the processor or the computer to perform a method for processing samples of an image or sequence of images, the method comprising the steps of:

encoding a first set of samples with a first encoding process;

encoding a second set of samples with a second encoding process;

filtering reconstructed samples of the first set based on information associated with at least one of the first encoding process and the second encoding process; and combining the filtered reconstructed samples of the first set with reconstructed samples of the second set to obtain a new representation of the reconstructed samples of the second set; and wherein the filtering comprises a multi-hypothesis filtering and a confidence value comprising a difference between each filtered reconstructed sample of the first set and samples lying within a filter support;

wherein the multi-hypothesis filtering comprises generating, for each reconstructed sample of the first set, a plurality of different filter outputs; and the combining includes selecting one of the different filter outputs as the filtered reconstructed samples of the first set;

wherein the selecting includes selecting one of the different filter outputs as the filtered reconstructed samples of the first set based on the confidence value in relation to a threshold.

54. A non-transitory computer-readable storage media that comprises a set of instructions stored therewith which, when executed by a computer or one or more processing devices, causes, controls or programs the computer or devices to perform a method for processing samples of an image or sequence of images, the method comprising the steps of:

encoding a first set of samples with a first encoding process;

encoding a second set of samples with a second encoding process;

filtering reconstructed samples of the first set based on information associated with at least one of the first encoding process and the second encoding process; and combining the filtered reconstructed samples of the first set with reconstructed samples of the second set to obtain a new representation of the reconstructed samples of the second set; and wherein the filtering comprises a multi-hypothesis filtering and a confidence value based on a differential between each filtered reconstructed sample of the first set and samples lying within a filter support;

wherein the multi-hypothesis filtering comprises generating, for each reconstructed sample of the first set, a plurality of different filter outputs; and the combining includes selecting one of the different filter outputs as the filtered reconstructed samples of the first set;

wherein the selecting includes selecting one of the different filter outputs as the filtered reconstructed samples of the first set based on the confidence value in relation to a threshold.

55. A system for processing samples of an image or sequence of images, the system comprising:

means for encoding a first set of samples with a first encoding process;

means for encoding a second set of samples with a second encoding process;

means for filtering reconstructed samples of the first set based on information associated with at least one of the first encoding process and the second encoding process; and means for combining the filtered reconstructed samples of the first set with reconstructed samples of the second set to obtain a new representation of the reconstructed samples of the second set; and wherein the filtering comprises a multi-hypothesis filtering and a confidence value comprising a difference between each filtered reconstructed sample of the first set and samples lying within a filter support;

wherein the multi-hypothesis filtering comprises generating, for each reconstructed sample of the first set, a plurality of different filter outputs; and the combining includes selecting one of the different filter outputs as the filtered reconstructed samples of the first set;

wherein the selecting includes selecting one of the different filter outputs as the filtered reconstructed samples of the first set based on the confidence value in relation to a threshold.

56. The method as recited in claim 1, wherein the selecting includes selecting one of the different filter outputs as the filtered reconstructed samples of the first set based on the confidence value.

57. The method as recited in claim 1, wherein:

the first set of samples comprises high-quality samples; and the second set of samples comprises low-quality samples.

* * * * *